United States Patent [19]
Williams et al.

[11] 3,860,317

[45] Jan. 14, 1975

[54] PROBE CONNECTOR RECEPTACLE DEVICE FOR AREA TYPE ELECTRICAL DISTRIBUTION SYSTEM

[75] Inventors: Lon A. Williams, Wareham; George B. Williams, New Bedford, both of Mass.

[73] Assignee: Dole Electro-Systems, Incorporated, Palo Alto, Calif.

[22] Filed: Nov. 21, 1973

[21] Appl. No.: 417,776

Related U.S. Application Data
[62] Division of Ser. No. 328,144, Jan. 30, 1973, Pat. No. 3,809,969.

[52] U.S. Cl. ............. 339/94 A, 339/96, 339/117 R, 339/278 D
[51] Int. Cl. ............................................ H01r 13/52
[58] Field of Search ....... 339/94, 96, 115, 116, 117, 339/278 D

[56] References Cited
UNITED STATES PATENTS

| | | | |
|---|---|---|---|
| 2,858,518 | 10/1958 | Chrystie et al. | 339/96 |
| 3,241,095 | 3/1966 | Phillips | 339/117 R X |
| 3,643,207 | 2/1972 | Cairns | 339/96 |
| 3,809,966 | 5/1974 | Tirrell et al. | 339/96 X |

Primary Examiner—Richard E. Moore
Attorney, Agent, or Firm—Owen, Wickersham & Erickson

[57] ABSTRACT

A receptacle device for use with an area type electrical power and/or signal distribution system that utilizes a laminated structure having conductive layers spaced apart by dielectric layers comprises a generally planar base unit for supporting a plurality of probe elements in an upright and spaced apart arrangement to enable them to be simultaneously driven into the laminated structure of said system. A housing unit removably attached to the base unit includes an electronics package with connector pins in contact with said probe elements that are connected to internal circuit means secured within the package, and a resilient, shock-absorbing cover means surrounding the electronics package. The housing unit also supports exterior plug-in receptacle means connected to the circuit means and adapted to receive conventional plug-in connectors so that when the probe elements are installed within a laminated structure in contact with said conductive layers an electrical path is provided through them to said connector pins, through said circuit means and to said exterior receptacle means to its plug-in connector.

5 Claims, 20 Drawing Figures

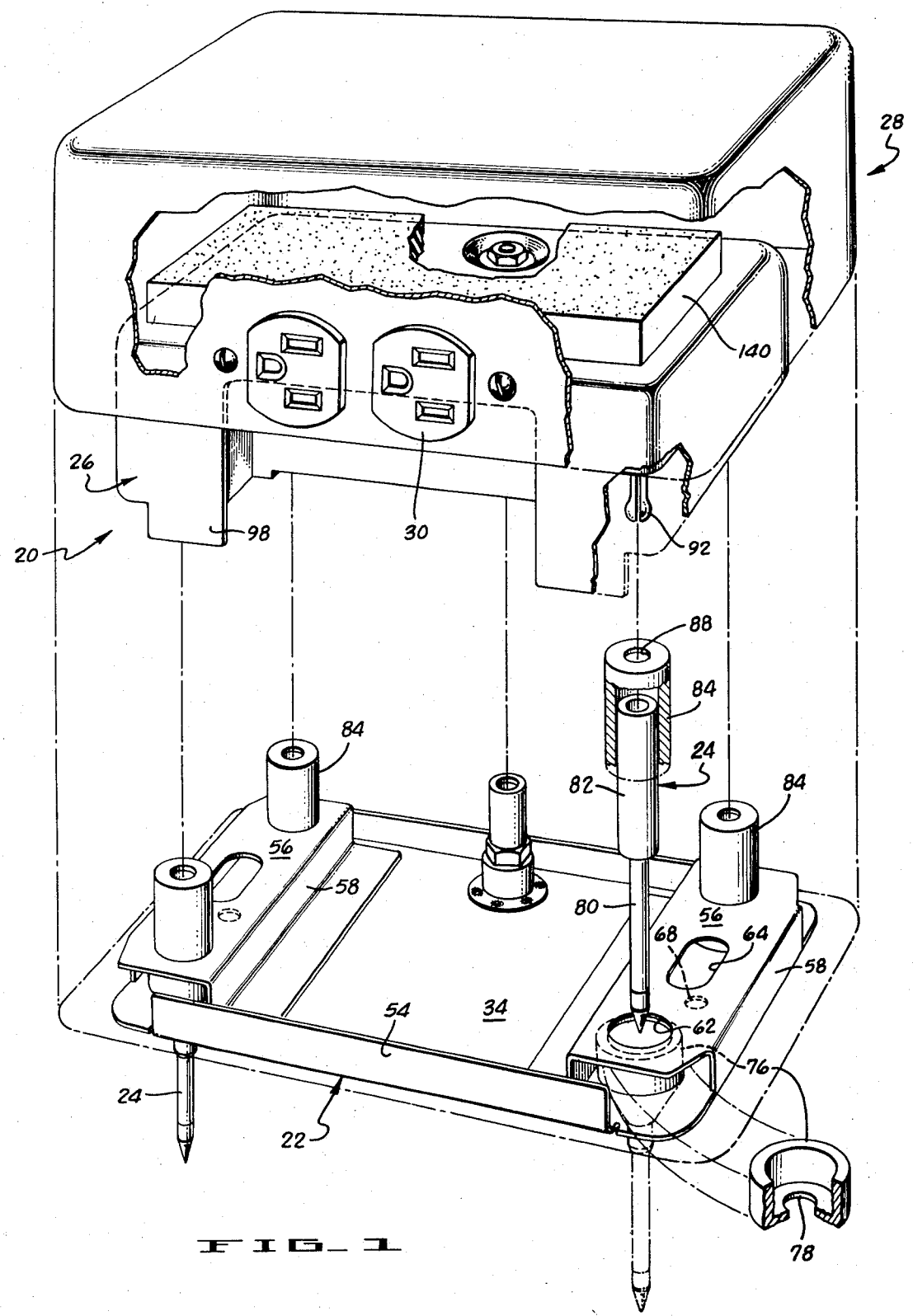
FIG_1

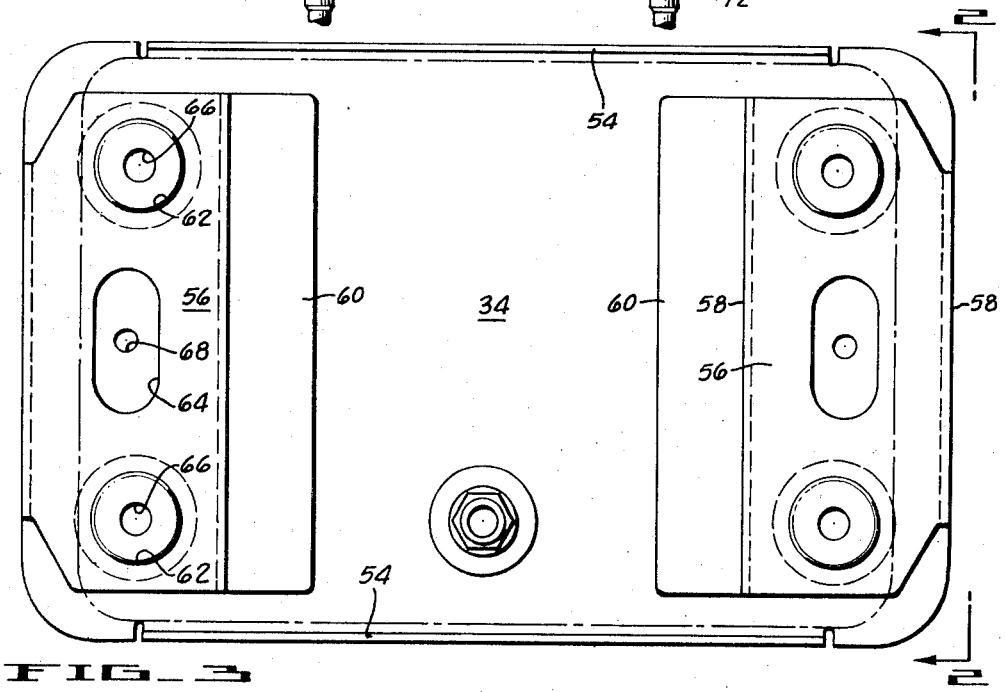
FIG_2
FIG_3
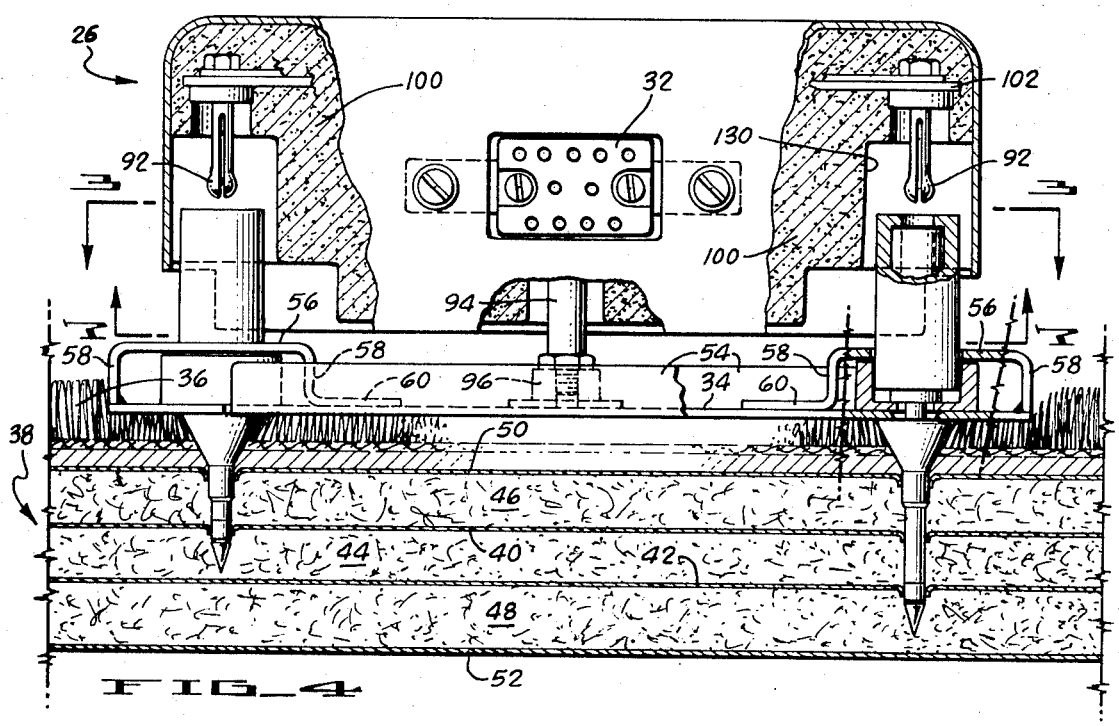
FIG_4

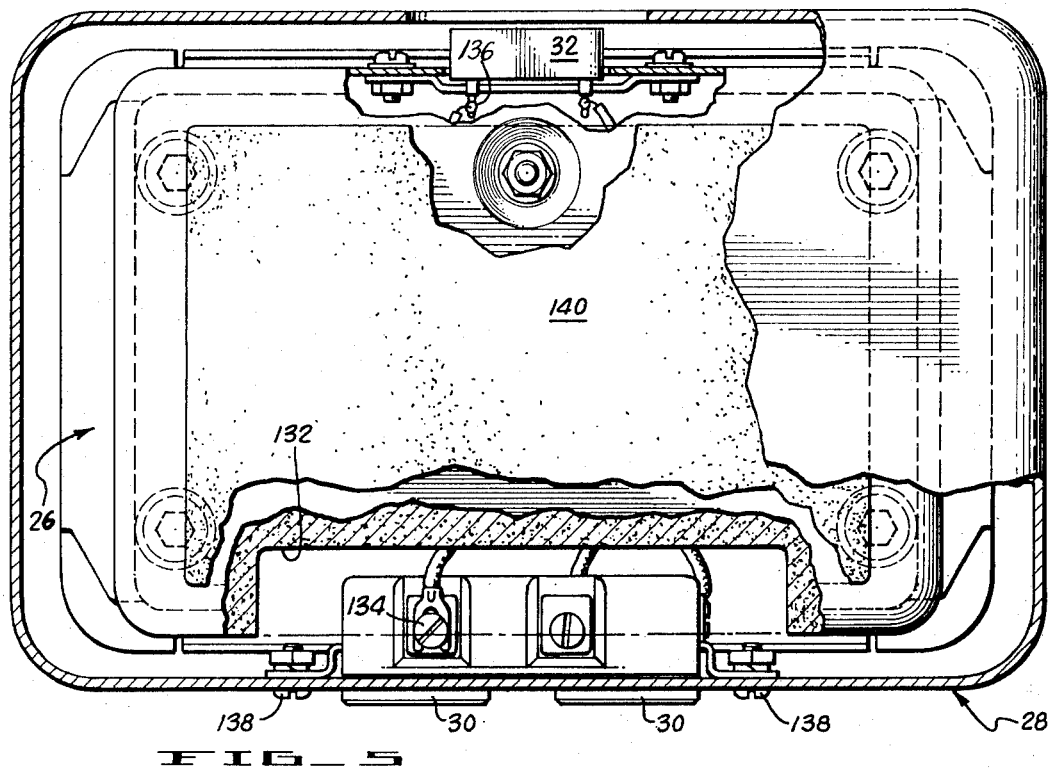
FIG_5
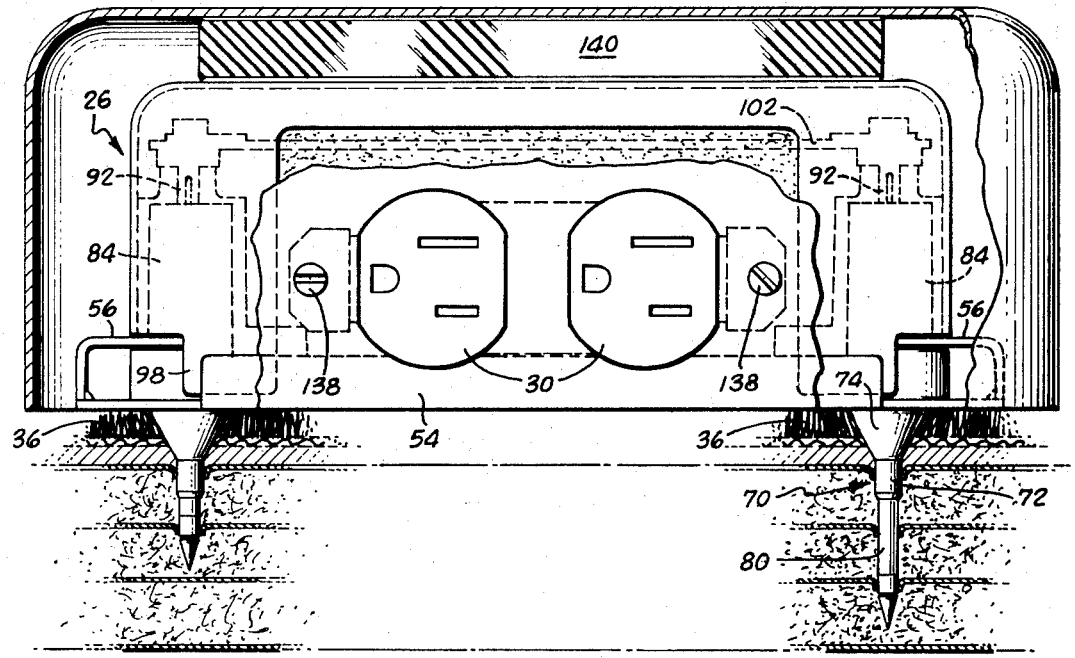
FIG_6

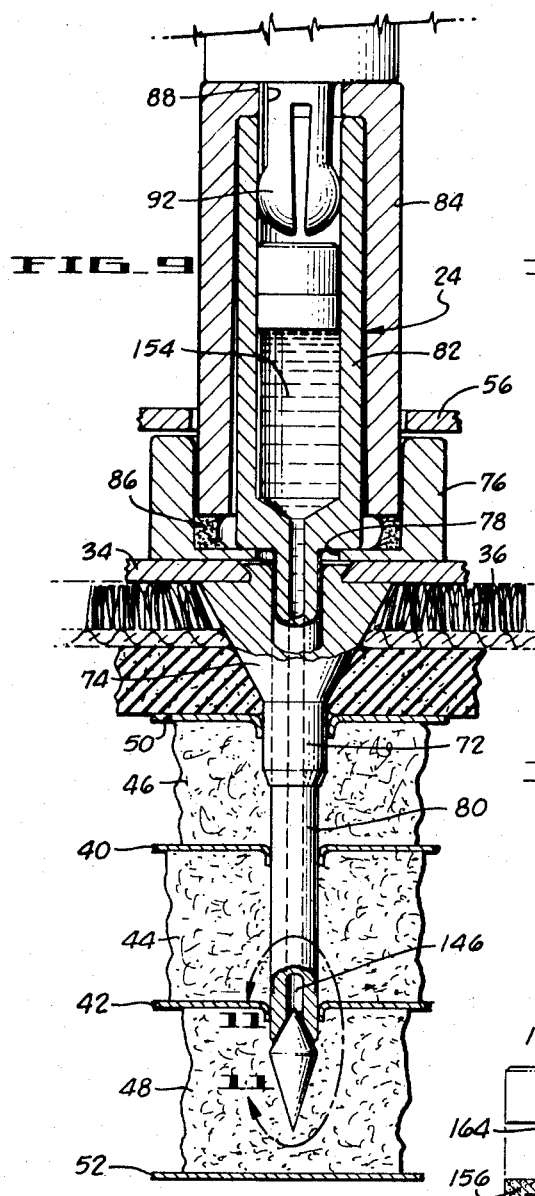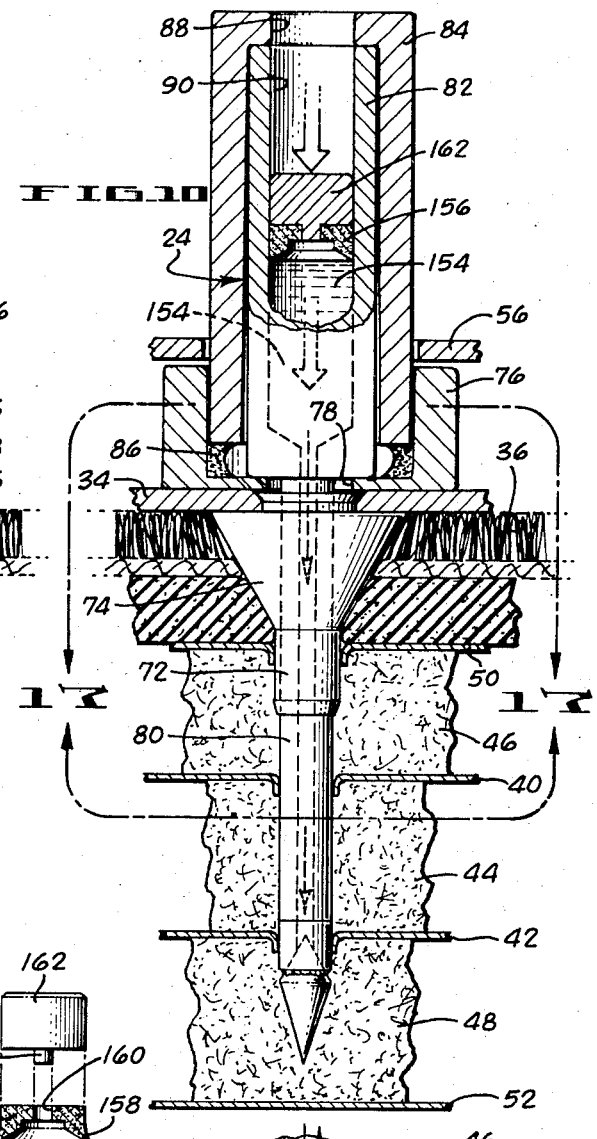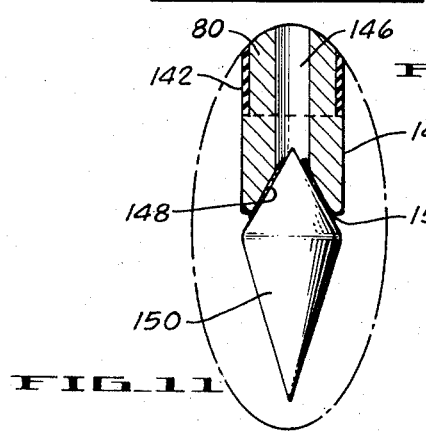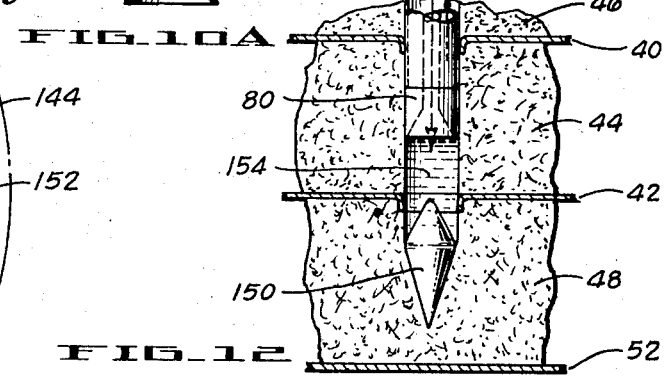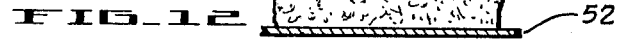

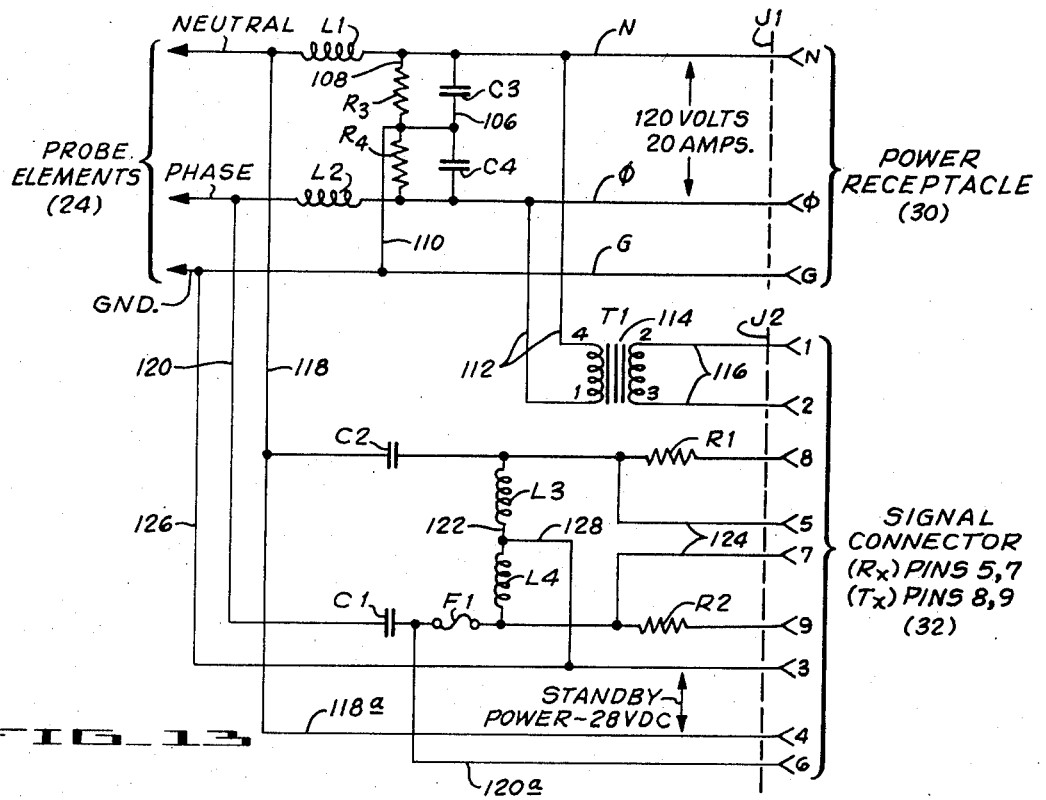
FIG_13.
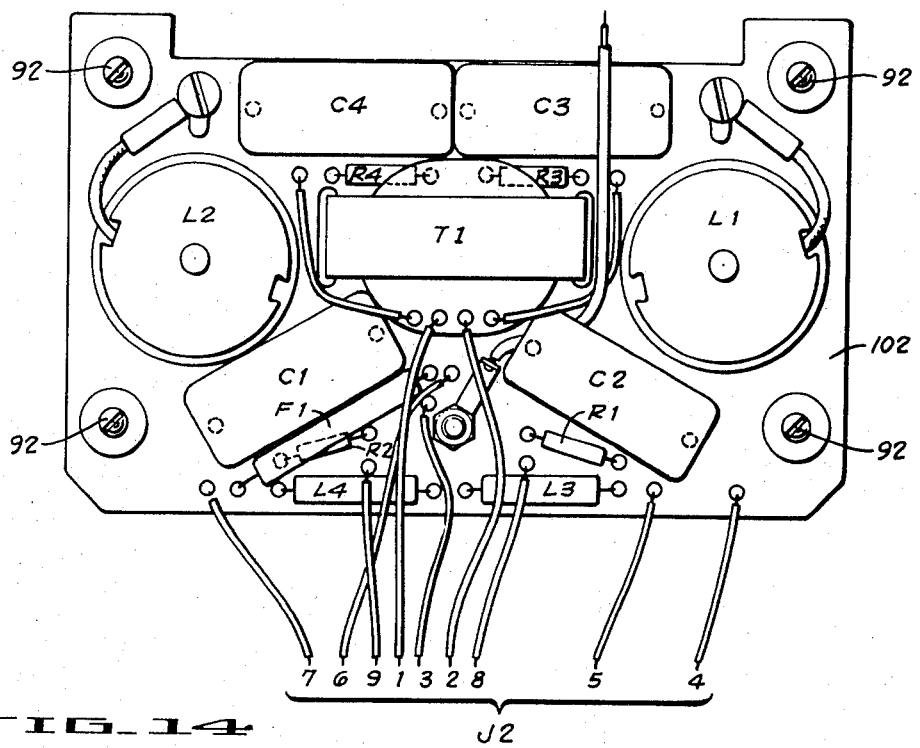
FIG_14.

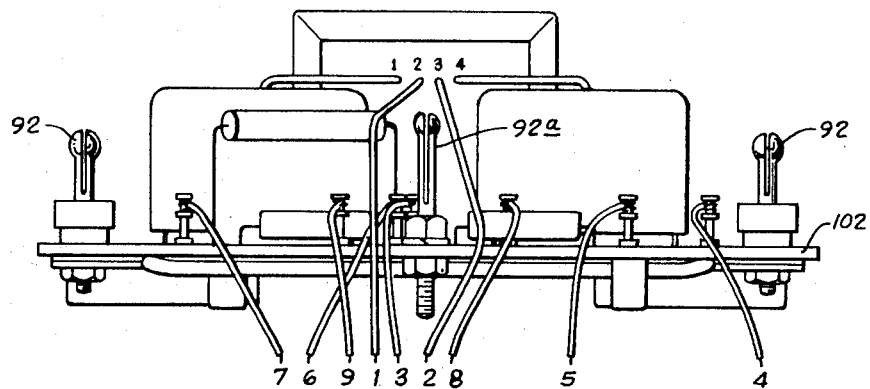
FIG_15
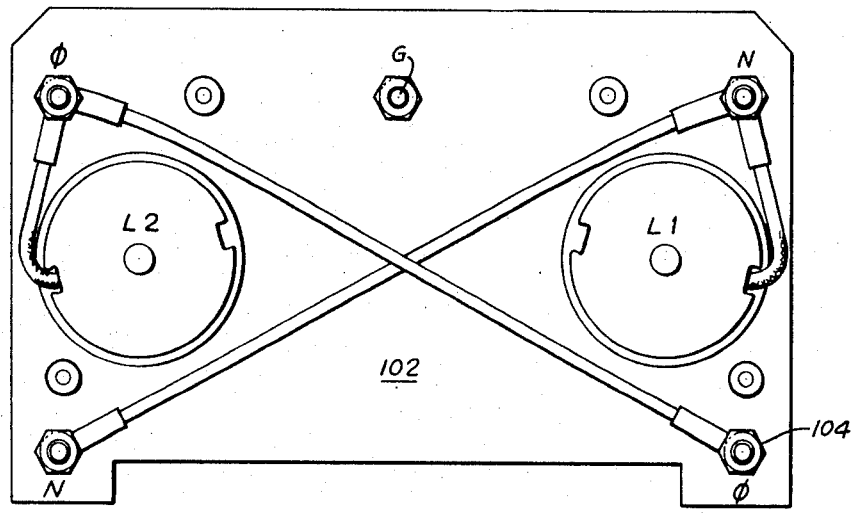
FIG_16
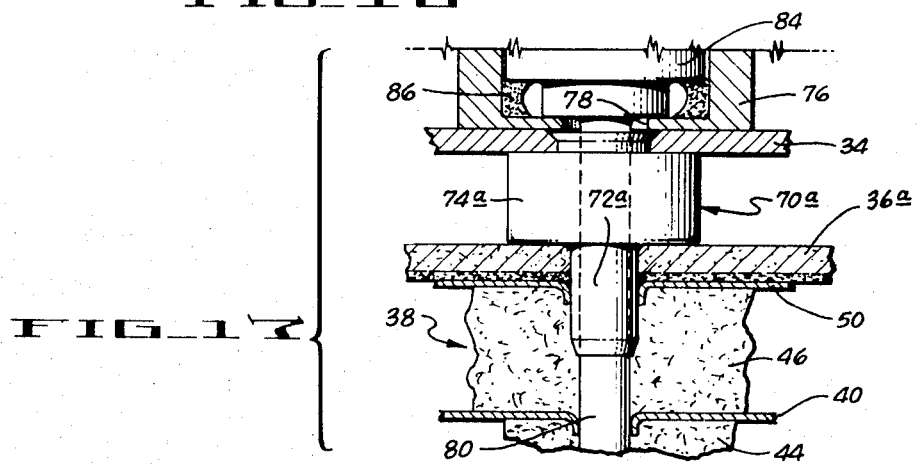
FIG_17

PROBE CONNECTOR RECEPTACLE DEVICE FOR AREA TYPE ELECTRICAL DISTRIBUTION SYSTEM

This is a division of application Ser. No. 328,144, filed Jan. 30, 1973, now U.S. Pat. No. 3,809,969.

FIELD OF THE INVENTION

This invention relates to electrical interconnecting devices and more particularly to an electrical receptacle device for use in an area type power and signal distribution system which can be installed at randomly selected locations in a laminated power and/or signal carrying floor structure.

BACKGROUND OF THE INVENTION

As described in U.S. Pat. No. 3,401,469 an area type power and/or signal carrying system comprises a floor structure having spaced apart conductive layers that carrry electrical energy. In application Ser. No. 191,392 filed Oct. 21, 1971 such a system is shown in the form of interconnected laminated panel units. To extract energy from any randomly selected location on an area type system it is necessary to penetrate the laminated floor structure so that proper electrical contact is made with the power and/or signal carrying layers. In the area type distribution system using panel units, each unit is a rigid structure made of laminated metal and dielectric materials. Hence, a receptacle for use with such panel units must have a unique capability of penetrating the panel structure to the necessary depth without damaging its probe or pin elements and then of being withdrawn at some subsequent time when it is desired to move or eliminate the receptacle installation. Yet the receptacle must provide a shock proof housing that will protect the electrical and electronic components necessary to accomplish the extraction and connection of electrical power and signal energy with other conventional connectors.

A general object of the present invention is to provide a receptacle device that solves the aforesaid problems and more particularly one that is adapted for use with rigid laminated panel units of an area type power and/or signal distribution system.

Another object of the present invention is to provide a receptacle device with a base unit that has strength necessary to enable it to be driven through laminated layers of metal and dielectric materials without being damaged.

Another object of the present invention is to provide a receptacle device with a housing unit that is shock resistant when installed so that it cannot be damaged by any of the common side or falling impact forces that floor receptacles are normally subject to and will protect electronic components and circuitry contained therein.

Another object of the present invention is to provide a receptacle device that is compact in size and shape and relatively pleasing to the eye when installed.

Another object of the present invention is to provide a receptacle device that is easy to install without highly skilled labor and readily attachable to suitable installation and extraction tools.

Still another object of the present invention is to provide a receptacle device that is particularly well adapted for ease and economy of manufacture in large quantities.

Yet another object of the present invention is to provide a receptacle device that can readily accommodate electronic components and circuitry for different operative modes such as power only, signal only or combined signal and power.

Another object of the present invention is to provide receptacle base and housing units that are connectable together to form an operable device and are electrically safe and in compliance with accepted code standards.

Another object is to provide a conductive probe for use with a receptacle device adapted for an area type distribution system.

Another object of the present invention is to provide a probe for a penetrating receptacle assembly that can be driven into a relatively hard surfaced, dense and rigid material without being damaged and having a tip which will separate from the probe so that a sealing compound can be dispensed as the probe is removed from the laminated structure.

BRIEF SUMMARY OF THE INVENTION

The receptacle device according to this invention comprises generally a rigid base unit that provides a support and guide for a plurality of probe elements. These probe elements are retained in the base unit so that their upper head ends will extend above and be engageable with contact pins of a receptacle housing. The latter includes an electronic package or unit comprised of elements forming circuit means for separating power and signal energy for interconnection with standard plug-in connector components located on the receptacle housing. Within the electronic unit, the aforesaid elements are conveniently mounted on a circuit board encased in potting compound. Surrounding the electronic unit and attached to it by a yieldable pad is a shock absorbing cover member. The base unit is readily attachable to an installation machine capable of driving its probe elements to a predetermined depth into the floor structure so that they will make proper contact with conductive layers therein. Once the base unit is in place the housing unit is quickly and easily attached to it. When it becomes necessary to remove the receptacle device the housing unit is removed from the base unit which is readily connectable to an extraction tool for providing an upward force that withdraws the probe elements from the laminated floor structure. As part of this invention the probes are constructed so that they will dispense a viscous filler material into their holes as they are being withdrawn thereby preventing moisture from penetrating the laminated structure.

Other object, advantages and features of our invention will become apparent from the following detailed description taken in conjunction with the drawings.

BRIEF DESCRIPTION OF THE DRAWINGS

FIG. 1 is an exploded view in perspective showing the basic components of a receptacle device embodying the features of the present invention;

FIG. 2 is a fragmentary end view of the base unit of our receptacle device;

FIG. 3 is a plan view of the base unit shown in FIG. 2;

FIG. 4 is a side exploded view in elevation and partially in section showing the receptacle base unit and a receptacle housing unit with its cover removed and in position to be attached to the base unit;

FIG. 5 is a plan view partially in section of our receptacle device;

FIG. 8B is a front view in elevation of our receptacle device having a cover member with sloped sides;

FIG. 8C is an end view in elevation and in section of the receptacle device of FIG. 8B;

FIG. 9 is an enlarged view in elevation and in section showing a probe element in place when fully installed within the laminated flooring structure;

FIG. 10 shows a view in section of the probe element of FIG. 9 showing internal details of its sealant dispensing elements;

FIG. 10A is an enlarged exploded view of the probe piston and its pusher;

FIG. 11 is an enlarged fragmentary view in section showing the lower end of a probe element;

FIG. 12 is an enlarged view in section showing the separation of the probe tip as it is withdrawn from the floor structure;

FIG. 13 is a schematic diagram showing the elements for a power and signal transmitting system that are contained in the housing unit of our receptacle device;

FIG. 14 is a plan view showing the physical arrangement of the elements for the power and signal system of FIG. 13;

FIG. 15 is a view in side elevation showing the circuit elements of FIG. 14;

FIG. 14 is a plan showing the top side of the circuit board of FIGS. 14 and 15; and FIG. 17 is an enlarged fragmentary view in elevation and in section showing a modified form of base unit for use on floor tile material.

DETAILED DESCRIPTION OF EMBODIMENTS

Figure 7:
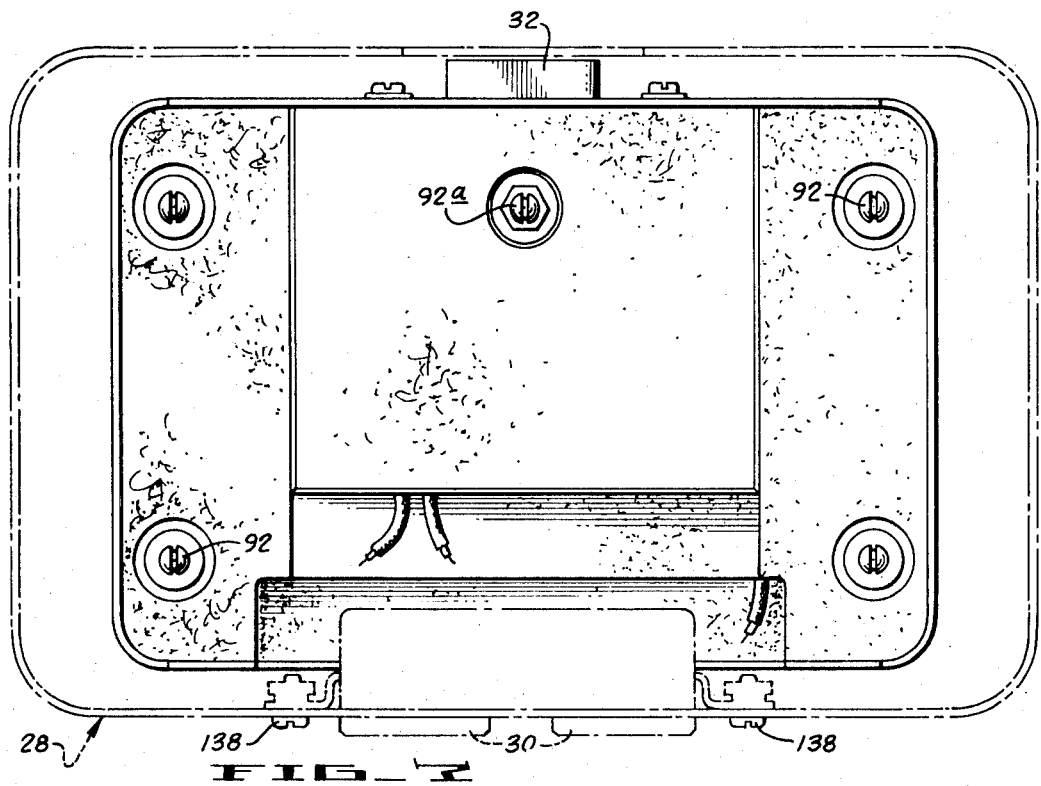
FIG. 7 is a bottom view of our receptacle device.
Figure 8A:
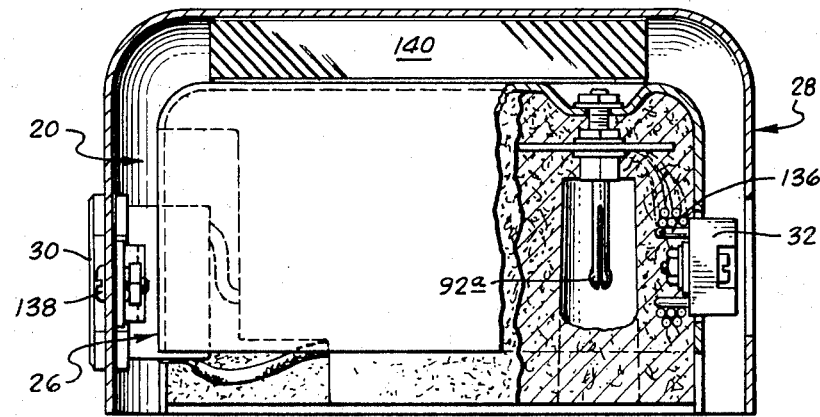
FIG. 8A is an end view in section of the receptacle device of FIG. 5, with portions of the housing unit broken away.

FIG. 1 is an exploded view in perspective of a receptacle device 20 embodying the principles of the present invention which broadly comprises a base unit 22 supporting a series of contact probe elements 24 and a receptacle housing unit attached to the base unit. This housing unit comprises an electronic package 26 with a shock absorbing cover member 28 attached to it and supporting receptacle members 30 and 32 (FIG. 4) adaptable to receive conventional plug-in connectors for power and signal energy respectively. The base unit is adapted to connect with an installation tool for driving the probe elements into a laminated floor structure and also with an extraction tool for removing them. Such an installation tool is described in application Ser. No. 370,407 filed June 15, 1973 and an extraction tool is described in application Ser. No. 376,549 filed July 5, 1973.

The base unit 22 is made of a suitable strong and rigid material such as sheet steel. In the embodiment shown, it has a flat, generally rectangular main body 34 adapted to be near or against the exterior floor surface 36, which may be either carpet, as shown in FIG. 4, or some form of linoleum or tile material. Such surface material normally covers the laminated power and/or signal carrying floor structure 38, typically shown as comprising a pair of internal conductive layers 40 and 42 separated by a dielectric layer 44, upper and lower dielectric layers 46 and 48, and upper and lower conductive ground layers 50 and 52. Upturned side flanges 54 are provided to stiffen the body 34 and extending across each end is an inverted channel shaped member 56. Each channel has a web portion parallel to and spaced above the main body and side flanges 58 secured to the main body 34 by suitable weldments or fasteners. The inner flange of each channel is preferably provided with an integral tab portion 60 that can be spot welded to the main body. Each web portion has two circular holes 62 near its opposite ends that are spaced equally from a central, elongated hole 64. The latter holes are used in attaching the base unit to either of the afore-said installation and extraction tools. Vertically aligned with each circular hole 62 in the channel web is a smaller hole 66 in the main body. A similar smaller hole 68 is provided in the body directly below each elongated hole 64. Extending below the base body around each of the holes 66 are a series of projections 70 made of a hard metal material and capable of penetrating the surface of a floor covering as the base plate is installed and particularly the upper conductive layer 50 so as to make a good electrical ground contact with it. In the embodiment of FIG. 2, which is adaptable for use on carpeted floor covering, each projection 70 has a tubular lower end portion 72 with an edge that is beveled so as to increase its penetrating ability. Spaced above this lower edge is a conical portion 74 of each projection which is fixed, as by welding, to the underside of the flat body member 34. This conical portion serves to separate the carpeting fabric during installation of a base unit so that the lower tubular end portions can make a good contact with the upper conductive ground layer 50. When the receptacle device 20 is to be installed on an uncarpeted floor surface such as linoleum or plastic tiles, modified projections 70a are used on the base unit 22. As shown in FIG. 17, these projections have a cylindrical portion 74a rather than one with a conical shape. The length of this cylindrical portion forms a shoulder that bears against and spaces the body 34 of the base member above the linoleum surface 36a, while the lower tubular portion 72a actually penetrates through the linoleum material and through the upper conductive ground layer 50 of the laminated floor structure.

Associated with the base unit for holding the probe elements 24 in position are four cup-like retainers 76, as shown in FIGS. 1 – 3. Each of these retainers are made of a non-conductive plastic material and they fit between the channel web portion and the body plate 34 in alignment with the holes 62 and 66. Thus, the inside diameter of each retainer 76 at its upper end is equal to the diameter of a hole 62, while a concentric hole 78 is provided in its bottom end having the same diameter as a hole 66.

Each probe element 24 has a lower shank portion 80 of a substantially uniform diameter and an upper tubular portion 82 of a somewhat larger diameter. When a probe element is loaded in the base unit 22 ready for installation, its lower shank portion extends through the hole 78 of the retainer 76, the hole 66 of the body plate 34 and downwardly through the projection 70. Its upper portion 82 extends above the base unit and fitted over each cylindrical portion is an elongated insulator 84. This insulator is sized so that its tubular lower end fits within the cup shaped retainer 76, thereby surrounding the upper portion of the probe element between the web portion and body plate of the base unit. An adhesive bonding material 86 such as a suitable epoxy is used to join the retainer and insulator members together to permanently retain the probe elements on the base unit. The metallic upper end portion of each probe element is thus completely surrounded by insulating non-conductive material except for an opening 88 in the upper end of each insulator 84.

The upper tubular portion 82 of each probe element 24 has a cylindrical cavity 90 whose diameter is approximately equal to that of the opening 88 in each insulator 84. These cavities therefor form female couplings for a series of spaced apart contact pins 92 extending downwardly from the electronics package 26 of the housing unit. These pins may be of the standard bifurcated type with enlarged contact portions at their lower ends. There is one contact pin 92 for each probe element plus one additional pin 92a extending from the housing that fits within a tubular connector 94 which is supported in a threaded boss 96 fixed to the body plate 34 of the base unit. Thus, the boss 96 and pin 92a provide a ground connection between the base unit and housing unit.

The electronic package 26 of the housing unit comprises an outer shell-like skin 98 which may be formed from a suitable sheet metal or plastic material. Supported within this shell by a potting compound 100 is a generally rectangular shaped circuit board 102. The compound may be of any suitable type and preferably it completely surrounds the board. Located at the four corners of this board are the connector pins 92 secured thereto by nuts 104 threaded to stud portions that extend through the board.

The receptacle device 20 may be made to operate in various modes depending on the type of area type distribution system with which it is to be used. For example, it may be used to extract power only, signal energy only, or both power and signal energy from the conductive layers of a laminated structure. These various modes can be accomplished by varying the electrical elements and circuitry mounted on the board 102.

FIGS. 13 – 16 refer to a combined power and signal energy circuit which is the most versatile mode for the receptacle assembly. FIG. 13 shows a circuit diagram illustrating an electrical arrangement designed to supply 15 amps of 60 Hz power from the probe elements 92 to the standard duplex power receptacle 30. The leads designated N (neutral), $\phi$ (phase) and G (ground) extend from this power receptacle. The neutral lead (N) is connected in parallel to two of the connector pins 92 at opposite corners of the board 102 and the phase leads $\phi$ are similarly connected to the other two pins 92. The ground lead G is connected to the ground pin 92a. In the neutral and phase leads are a pair of coils $L_1$ and $L_2$ respectively providing a predetermined amount of inductance (e.g., 40 micro henrys) and extending between the neutral and phase leads is a cross lead 106 containing a pair of capacitors $C_3$ and $C_4$ (e.g., 0.5 microfarads). $L_1$, $C_3$ and $L_2$, $C_4$ combine to form L type low pass filters to the power receptacle 30, which also function to alternate the signal frequencies present on the probe elements, thereby preventing their appearance on the duplex power receptacle 30. Another cross lead 108 between these neutral and phase leads contains a pair of resistors $R_3$ and $R_4$ (e.g., 1 megohm). Capacitors $C_3$ $C_4$ and resistors $R_3$ and $R_4$ are grounded to the lead G by a lead 110. From the neutral and phase power leads a pair of leads 112 extend to a transformer $T_1$ whose output leads 116 connect with the signal connector receptacle 32, thereby providing a 60 Hz low voltage (e.g., 26 v. at 200 ma) power to the receptacle 32 for use by signal equipment. To extract the signal energy that is multiplexed on the neutral and phase power leads are a pair of leads 118 and 120 that extend to pins 8 and 9 of the signal receptacle 32. A pair of capacitors $C_1$ and $C_2$ (e.g., 0.5 microfarads) and resistors $R_1$ and $R_2$ are connected in the leads 120 and 118 respectively, and a pair of inductance coils $L_3$ and $L_4$ are provided in a cross lead 122. The elements $L_3$, $C_2$ and $L_4$, $C_1$ are L type high pass filters which serve to prevent the 60 Hz power from being applied through pins 5, 7, 8 and 9 of the signal receptacle 32. They do, however, allow the communications frequencies to pass freely in both directions between the probe elements 24 and the signal receptacle 32. The resistors $R_1$ and $R_2$ are used to match the transmit circuit of the signal equipment used on the area type system. Resistors $R_3$ and $R_4$, mentioned above, insure that all capacitors $C_1$, $C_2$, $C_3$ and $C_4$ are discharged when power is shut off or the unit is disconnected. Additional leads 124 which bypass the resistors $R_1$ and $R_2$ are connected from the leads 118 and 120 to pins 5 and 7 of the signal connector 32. Another lead 126 extends from ground lead (G) to a pin 3, and the coils $L_3$ and $L_4$ are also grounded through it via a lead 128. A pair of leads 118a and 120a extending from the leads 118 and 120 are connected to a pair of pins 4 and 6 in the signal connector and provide energy for another standby power supply (28 VDC) for use by communication equipment at the connector 32. $F_1$ is a non-replaceable fuse for protecting equipment connected to the receptacle 32. In case $C_1$ or $C_2$ fails by shorting, $F_1$ will open, since 60 Hz power would be connected to ground through the fuse and the low resistance of $L_4$.

The circuit elements as described above are arranged in a compact manner and mounted on the board 102 as shown in FIGS. 14 – 16. Generally, all elements are mounted on the bottom side of the board and extend downwardly. The interconnections of various terminal or connection points may be accomplished by conventional packaging and printed circuit techniques, so that a highly reliable, durable and shock-proof assembly is formed.

Figure 6B:
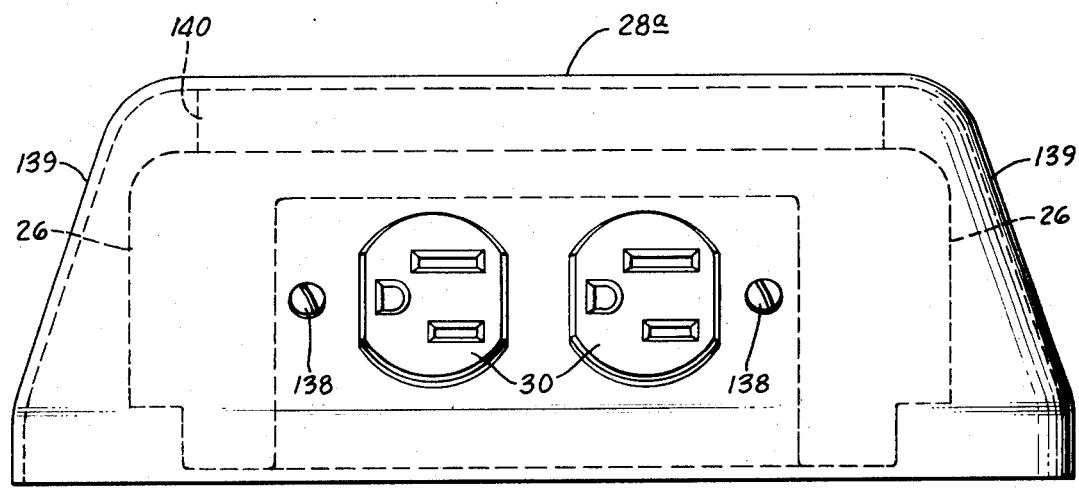
FIG. 6 is a view in side elevation and partially in section of the receptacle device of FIG. 5.
Figure 6C:
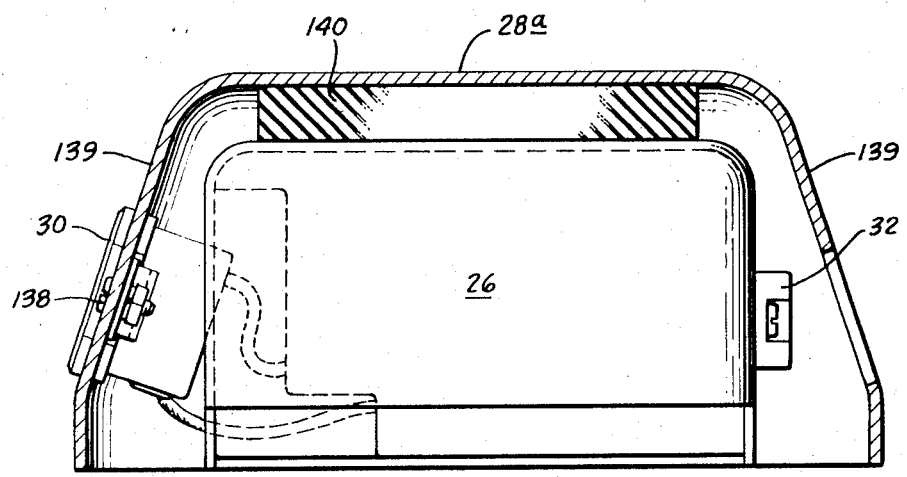

As shown in FIGS. 4 – 6, the potting compound surrounding the board 102 and its attached electrical components is formed to provide cylindrical cavities 130 surrounding each pin connector 92 and a larger cavity 132 along one side to provide clearance for the power receptacle 30 (See FIGS. 5 – 8). Thus, when the housing unit 26 is attached to the base unit 22, the connector pins 92 fit snugly into the upper ends of the probe elements 24 and the lower edge of the housing unit rests flush against the top of the base unit. Wire leads from the various electrical components as described relative to FIG. 13 extend out of the potting compound and are connected in a suitable manner to terminals 134 and 136 on the power and signal connector receptacles 30 and 32 respectively. The signal receptacle 32 is mounted on one sidewall of the electronic package 26 by screws attached to its shell 98 and is accessible through a side opening in the cover 28. The cover is made of a suitable thin-walled material with a shape that may be similar to but somewhat larger than that of the electronic package. The power receptacle 30 which may be the standard duplex type, as shown, is mounted on a sidewall of the cover by a pair of screws 138. The cover is secured to the flat top of the electronics package 26 of the housing unit by a semi-resilient pad 140 of uniform thickness. This pad is made of some suitable resiliently compressible material such as a cellular rubber or plastic and is adhesively bonded to both the top of the electronics package and to the inside surface of the cover. Thus, it spaces the cover above and outwardly from the sides of the electronic package and thereby provides a resilient shock absorbing barrier around it. While the cover may have vertical sidewalls as shown in FIGS. 1, 5 and 6, it is preferably in some instances to provide a cover with sloped sidewalls 139, as shown in FIGS. 8B and 8C. These sloped sides on the cover together with its resilient mounting by means of the shock pad 140 provide several advantages. For example, when struck from any angle, the sloping sides deliver a downward component of force to the entire receptacle housing and base unit combination, which tends to cause it to resist undesired displacement from the floor structure by the impact. Also, a cover with the sloped sides 139 preserves all of the shock-mitigating action of the elastomeric pad 140. With either sloped or straight sides, the cover 28 may be made of materials such as thin sheet metal or ABS plastic, and this will provide an additional shock absorbing capability, due to the inherent flexure characteristics of the materials.

The probe elements 24 are vital components to the operability of the entire receptacle device 20 since they must have a capability of penetrating fairly hard and dense laminated floor structures used for area type power and signal distribution systems and thereafter of maintaining good electrical contact with one of the internal conductive layers. Each probe element also provides a means for dispensing a sealant into the hole it normally forms and leaves as it is withdrawn from a floor structure. As described earlier and shown in FIGS. 9 – 12, each probe element has an upper tubular body portion 82 and an integral shank portion 80 extending downwardly therefrom. Both body and shank portions may be formed from a suitable metal material such as beryllium copper. Spaced from the lower end of each probe element is the lower edge of an insulating coating 142 which extends upwardly to the shoulder formed by the larger body portion (FIGS. 9 and 11). This coating may be made of a suitable non-conductive epoxy material that is hard and durable so that it will not be scraped off or damaged when the probe elements are driven into a laminated floor structure. Thus, the lower end 144 of each probe element has an exposed metal on its surface which makes a good electrical contact with either of the two internal conductive layers of the floor structure when the base unit and its probe elements are properly installed to their operable position. The probe elements for contacting the neutral conductance layer are therefore different in length than those intended to contact the phase conductive layer. Preferably, the phase and neutral probe elements are located at opposite corners of the base unit as indicated in FIG. 16, in order to help maintain them straight or vertical as they are being driven into operable position.

As previously stated the upper body portion of each probe element has a cylindrical cavity 90 and at its bottom this cavity opens into a concentric but narrower passage 146 which extends entirely through the shank portion of the probe element to its lower end. At its lower end the passage diverges to form a conical seat 148 for a tip member 150. This tip is made of a hardened, non-conductive material having integral upper and lower conical portions, the upper conical portion having a matching slope for the conical seat and is secured within this seat by an epoxy adhesive 152 (FIG. 11). The lower conical portion of the tip member has a greater height to diameter ratio and is therefore more elongated so as to provide optimum penetrating ability.

As the base unit and its probe elements are driven into a laminated area type structure the probe tips remain attached to their probe shank (FIG. 9). When it becomes necessary to remove a probe element from the laminated structure they are drawn upwardly and the probe tip 150 detaches from the probe shank 80 and remains imbedded within the area structure (See FIG. 12). As the probe element is withdrawn, it dispenses a sealant 154 which is stored within its upper chamber 90. This sealant may be a suitable type of fluid that will remain in a viscous liquid form within the probe until it is forced out during its withdrawal to serve as a filler within the hole left by the probe element, thereby preventing any moisture or other foreign material from getting into the hole which could possibly cause an electrical short circuit between internal conductive layers or some other internal damage. When each probe element is ready for installation the sealant fills the narrow passage 146 and the lower part of the upper cavity 90, as shown in FIG. 9. On top of and in contact with the sealant is a piston 156 which forms a fluid tight seal with the wall of the cavity. The piston is spaced downwardly from the upper end of the probe element so that enough of the upper probe cavity 90 is left open to receive a contact pin 92 when the housing unit is in place on its base unit. The piston 156 is actually an annular element, preferably made of some low friction, plastic material such as polytetrafluoroethylene. As shown in FIG. 10a it has an annular lower skirt portion 158 which flares outwardly to a slightly greater diameter than that of the probe cavity, thereby providing a fluid tight seal with it when installed. The piston also has a central opening 160 so that when installed on top of the sealant all air bubbles can escape through it. On top of the piston is a rigid pusher element 162 preferably made of metal which is generally cylindrical with a central projection 164 that extends downwardly into the piston opening. This pusher element forms a tight sliding fit with the cavity 90 of the probe 24 so that it remains in place once intalled until acted upon by a rod of an extraction tool to dispense the sealant 154 as the probe element is being removed from a floor structure.

As stated above, the installation of our receptacle device is preferably accomplished by a machine which applies the required downward force to drive the probe elements 24 to their proper depth in a laminated structure. During this phase of the installation these probe elements are held in their driving position by the base element 22. Once properly driven to the correct level with the probe elements in contact with internal conductive layers of the laminated floor structure and the base unit members 70 in contact with an upper ground layer the housing unit can be quickly and easily connected in place. The connector pins 92 of the electronic package 26 are merely pushed downwardly into the cavities 90 of the probe elements until the housing unit is supported on the base.

In use, conventional plug-in connectors are inserted into the receptacle 30 to utilize the 60 Hz power that is being carried through the laminated floor structure. Simultaneously another plug-in connector may be inserted into the receptacle 32 to provide a conduit for filtered signal energy for use by communication equipment. The compact mounting of the electrical elements of the filtering circuit on the board 102 and the potting compound 100 surrounding them provides a first level of protection against any physical impact against the assembly. The cover and semi-resilient mounting pad 140 provide an added level of protection from all sides and the top. Thus, a blow against the cover from any side will be absorbed by its movement, and reduced impact shock will be imparted to the base unit and its probe elements.

The present invention solves the problem of accomplishing proper insertion of the probe elements in a rapid and efficient manner. The base unit is readily attachable to both installations and insertion tools and it is itself rugged and durable. Once in place, the housing unit containing the more delicate components is quickly attached and electrically connected to the probe elements. Therefore, both installation in and removal of the entire receptacle assembly from a laminated floor structure is easily accomplished and the electrical contacts and connections at all points are firm, durable and safe.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

We claim:

1. A probe element for use in a receptacle device of an area type power and/or signal distribution system, said probe element comprising:

an upper body member having a central cavity and an integral shank portion of a smaller diameter extending downwardly from said body member, said shank portion having a central passage extending from said cavity to an opening at the lower end of said shank portion; a tip member attached to the lower end of said shank portion and covering said opening therein; a quantity of viscous sealant filling said central passage and part of said cavity; and a movable piston means above said sealant within said cavity for forcing said sealant to disengage said tip means and dispense sealant through the opening of said passage when acted upon by an axial force within said cavity.

2. The probe element as described in claim 1 wherein said upper body member and said shank portion are made as one integral member from a hard conductive metal material, and a coating of non-conductive material extending from just below said upper body member to a point spaced from the lower end of said body member, thereby leaving an exposed conductive end portion on said shank portion.

3. The probe element as described in claim 2 wherein said opening in said shank portion is conical, and said tip member has an upper conical portion that fits within said conical opening and is bonded in place.

4. The probe element as described in claim 1 wherein said piston means comprises an annular piston member having a central opening and a radially outwardly flared skirt portion that presses tightly against the wall of said cavity, and a cylindrical piston pusher member having a projection that fits within said central opening of said annular piston member.

5. The probe element as described in claim 2 wherein said tip member is made of a hard ceramic material and has a lower conical portion that is integral with but longer than its said upper conical portion.

* * * * *